Patented Nov. 20, 1945

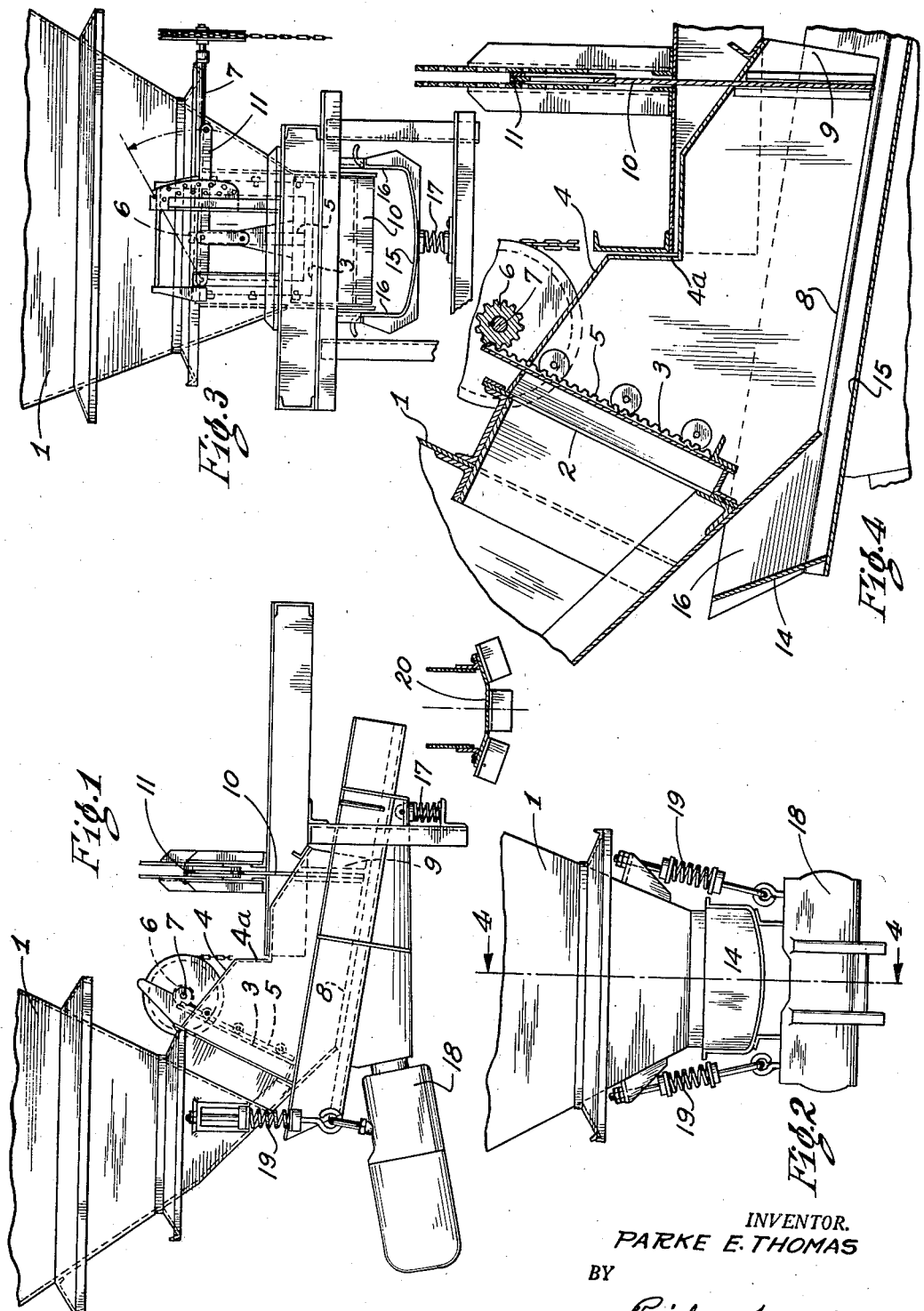

2,389,566

UNITED STATES PATENT OFFICE 2,389,566

SOLIDS FEEDER

Parke E. Thomas, Cleveland, Ohio, assignor to Republic Steel Corporation, Cleveland, Ohio, a corporation of New Jersey Application June 16, 1944, Serial No. 540,735

4 Claims. (Cl. 198—53)

This invention relates generally to the art of handling fine solids and more particularly to new apparatus for controlling the feed of fine solids from the hot fines return hopper of a sintering machine.

In the operation of sintering machines the material which is on the pallets and which has been subjected to sintering operations is discharged onto screens or grizzlies which permit the fine materials to pass therethru into a hot fines hopper but retain the larger pieces of sintered material. Frequently the sintering operation is not satisfactorily completed and when that is the case the fine material which passes thru the grizzly may include fine, unsintered, moisture containing material. When such material passes thru the grizzly and into the fines hopper therebeneath and is subsequently covered with hot dry fines, pressure is created in the material due to evaporation of the moisture from the unsintered, moist material. Since the fines are being continuously withdrawn from the fines hopper, the pressure thus created is usually relieved by escape of the water vapor thru the hopper discharge opening. Frequently the pressure created by these vapors is so high that when the gases escape thru the discharge opening of the hopper they, in effect, blow out large quantities of the fine material, often as much as several tons at a time. Since the fine materials from the hopper are fed into a pan and thence onto a conveyor, the capacity of the pan and conveyor may be greatly exceeed by such blow-outs, with the result that the fines will overflow the pan and conveyor and pile up on the floor. When such a blow-out occurs the fines which have overflowed the pan and conveyor must be cleaned up and frequently the sintering machine has to be shut down while that work is being done.

The present invention aims to prevent such blow-outs and the work, loss and annoyance incident thereto, and achieves this aim by providing new apparatus which prevents such blow-outs and necessitates escape of vapors under pressure in the hopper thru the inlet opening thereof.

In the drawing accompanying and forming a part of this specification,

Figure 1 is a side elevational view, showing one form of apparatus embodying the present invention associated with a fragmentary part of the fines hopper of a sintering machine and a conveyor for fines removed from said hopper;

Figure 2 is an end elevational view showing the left end of the apparatus of Fig. 1;

Figure 3 is an end elevational view taken from the right hand end of the apparatus of Fig. 1; and, Figure 4 is a vertical, central, sectional view taken on line 4—4 of Fig. 2.

In the drawing the fines hopper 1 of a sintering machine is provided with a discharge opening 2 in its lower portion and a gate 3 which serves to control the flow of fine material thru that opening. A housing 4 is attached to hopper 1 around opening 2 and gate 3 and has an opening in its upper wall thru which gate 3 may be moved by any convenient means as, for example, a rack 5 on the gate and a pinion 6 on a chain wheel actuated shaft 7, as is better shown in Fig. 3. This housing 4 extends downwardly and has an open bottom 8 and an open lower end 9 which is adjustably closed by a slide gate 10 which may be adjusted to any desired position by a lever 11.

The top wall of housing 4 has a transverse depression 4a which forms a restriction of the chamber within the housing.

A pan 14 is positioned beneath housing 4 and includes a bottom wall 15 which is located a few inches below the open bottom 8 of housing 4 and which projects beyond each end of the housing, as is better shown in Figs. 1 and 4. The pan 14 also includes side walls 16 which extend upwardly from the bottom wall 15 on the outside of housing 4, so that the housing and pan are, in effect, telescoped one into the other. Pan 14, near its discharge end, rests on spring supports 17 and at its other end is supported on a vibrator 18 which is connected to the hopper 1 by adjustable spring connectors 19. The vibrator 18 is connected to the bottom wall 15 of hopper 14 and is of the conventional electrical type. When energized, it causes the pan 14 to reciprocate endwise and thereby progressively feed fine material toward and off its lower discharge end onto a conveyor belt 20.

It will be noted that the lower end of gate 10 is shown as being approximately 3" from the top surface of bottom wall 15 of pan 14, and that the open bottom 8 of housing 4 is only a little farther above wall 15. It will also be noted that the side walls 16 of the pan extend well above the open bottom 8 of housing 4 and the bottom edge of door 10, that is, approximately 18". Since the sides of the housing are thus well telescoped between the sides of the pan and each side wall of the housing is close to its side wall of the pan, there is little tendency for fine materials to overflow the pan outside of the side walls of the housing. Substantially the only flow of fine materials from the housing into the pan is thru the open bottom of the housing and thence under gate 10 and onto conveyor 20.

In normal operation the gate 3 is raised far enough to permit a predetermined rate of flow of fines thru opening 2 and there is no substantial accumulation of fines in housing 4. When gas pressure is built up within the hopper 1 due to evaporation of moisture, this pressure may suddenly expel a large amount of fine material into housing 4, often completely filling the housing. The depression 4a in the top wall of the housing opposes expulsion of excessive amounts of material from the hopper, and, by restricting the chamber within the housing, impedes flow of excessive amounts of material into pan 14. Since that material cannot escape from the housing except along the bottom wall 15 of the pan, no blow-out can result and excess gas under pressure in the hopper will seek other outlets and will escape up thru the materials thereabove in that hopper. Since vibrator 18 is continually vibrating the pan and constantly feeding fine material beneath the lower edge of gate 10, any surplus of fines which may be expelled by gas pressure from hopper 1 into housing 4 will remain in the housing until they are removed by the vibration of the pan.

In this manner housing 4 acts as an expansion chamber into which fines may be expelled by gas pressure in the hopper and, when largely or substantially filled with fines, will act as a dam against further escape of gas therethru.

While the dimensions previously mentioned have been found to be quite satisfactory in commercial use, it is not to be understood that those dimensions are critical but only that they are given by way of illustration of dimensions which have given good satisfaction. Obviously, where the amount of moist material delivered into hopper 1 is small in amount and blow-outs are, therefore, uncommon or minor in force or volume, the gate 10 may be raised, provided of course that the carrying capacity of conveyor 20 is not exceeded. On the other hand, if the amount of moist material is larger and blow-outs are more common or greater in intensity or volume, the space between the open bottom of housing 4 and/or the lower edge of gate 10 may be decreased by adjusting the pan upwardly or the gate downwardly, or both.

Having thus described my invention so that others skilled in the art may be able to understand and practice the same, I state that what I desire to secure by Letters Patent is defined by what is claimed.

What is claimed is:

1. The combination of a hopper having a lateral discharge opening, a gate for said opening, a housing consisting of walls attached to the hopper about said opening, having a top opening thru which said gate may be moved and having an open bottom and an open lower end, said housing walls defining a chamber extending downwardly from said hopper at an acute angle to the horizontal, a gate for said open end of the housing and a vibrating pan comprising a bottom wall positioned adjacent to the open bottom of the housing and extending beyond its lower end, and side walls extending upwardly from the bottom wall outside of said housing.

2. The combination of a hopper having a lateral discharge opening, a gate for said opening, a housing consisting of walls attached to the hopper about said opening and having an open bottom and an open lower end, said housing walls defining a chamber extending downwardly from said hopper at an acute angle to the horizontal, the top wall of said housing having an opening thru which said gate may be moved and having a transverse depression between its ends forming a constriction of said chamber, a gate for said open end of the housing and a vibrating pan comprising a bottom wall positioned adjacent to the open bottom of the housing and extending beyond its lower end, and side walls extending upwardly from the bottom wall outside of said housing.

3. The combination of a hopper having a lateral discharge opening, a gate for said opening, a housing consisting of walls attached to the hopper about said opening, having an opening thru which said gate may be moved and having an open bottom and an open lower end, said housing walls defining a chamber extending downwardly from said hopper at an acute angle to the horizontal, a gate for said open end of the housing and an endwise reciprocable pan comprising a bottom wall positioned beneath and adjacent to the open bottom of the housing and extending beyond its lower end and side walls extending upwardly from the bottom wall in sufficiently close proximity to the outside of said housing to prevent substantial amounts of finely divided solids from passing upwardly out of said pan.

4. The combination of a hopper having a lateral discharge opening, a gate for said opening, an endwise reciprocable pan comprising a bottom wall and side walls extending upwardly therefrom, and means for conducting finely divided solids from said discharge opening to said pan, said means comprising a housing attached to the hopper about said opening and projecting into said pan, said housing consisting of top, side and bottom walls defining a chamber inclined downwardly at an acute angle to said trough, the top wall having an opening thru which said gate may be moved, the top and side walls of the housing extending beyond the vertical projection of the lower end of said bottom wall, and a movable gate at the lower ends of said top and side walls.

PARKE E. THOMAS.